Nov. 11, 1941.    D. P. LAVIETES    2,262,159
SMOKER'S PIPE
Filed Jan. 17, 1940

David P. Lavietes
INVENTOR
By Frank P. Wentworth
his ATTORNEY.

Patented Nov. 11, 1941

2,262,159

UNITED STATES PATENT OFFICE 2,262,159

SMOKER'S PIPE

David P. Lavietes, Brooklyn, N. Y.

Application January 17, 1940, Serial No. 314,221

4 Claims. (Cl. 131—225)

The invention relates to smokers' pipes and method of making same, and more particularly to a pipe in which the bit is connected to the bowl stem by means of co-operating screw threaded metallic fittings.

In smokers' pipes having a screw threaded connection between the stem and the bit, there is always a tendency of the bit to either overturn or to prematurely abut against the end of the stem, so that the flattened portion of the bit, when a tight joint has been formed between the bit adjacent its tenon and the stem, is sufficiently askew to cause the bowl of the pipe to tilt to one side or the other while the pipe is in use.

In the production of pipes, considerable difficulty is sometimes experienced in getting a proper fit of the bit in relation to the bowl, with a proper positioning of the bit to prevent this tilt of the bowl. Grinding of the stem is sometimes relied upon, to permit the end of the bit to abut squarely against the end of the stem so as to have a tight fit when a failure of the bit to have sufficient turning movement has to be compensated for.

With metal fittings, even greater difficulty is experienced than with a wood to a hardened plastic joint. The well known push tenon form of joint is extensively used to obviate this difficulty, irrespective of whether metal fittings or other materials about the joint are present.

Furthermore, when a metal fitting is used to connect the bit with the stem, the absence of a tight fit between the end of the stem and the adjacent end of the bit may, and frequently does, result in seepage of the precipitate between the tenon and the stem. This introduces a condition which is objectionable to many pipe smokers. The same condition is present with a smooth tenon as well as with a screw threaded connection between the bit and the stem if the end of the bit is not brought tightly against the end of the stem.

With the above conditions in mind, I have provided a pipe, the union between the bit and the stem of which is so constructed as to permit a tight fit between the two parts of the union, which will not only prevent the escape or seepage of the precipitate between the two parts of the fitting where the stem and the bit meet, but will permit the assembly in the factory of the bit and bowl in a manner to so position the flattened or splayed portion of the bit as to avoid any tilting of the bowl and any possibility of a loss in the relative position of parts after long continued use of the pipe and innumerable removals and replacements of the bit during cleaning of the pipe.

In securing this result, I combine in the pipe, all of the desirable characteristics of both a push tenon and a screw threaded connection form of pipe, although the push tenon connection is permanent as to one part of the fitting and the pipe stem, and only indirectly contributes towards the removal and replacement of the bit.

With this construction, a proper tightness between the metal fitting carried by the stem and the metal fitting carried by the bit is secured before the assembly of the bowl in the pipe structure, and a proper positioning of the bit in relation to the bowl is secured during assembling of the stem fitting and the stem, assembly of the bit in relation to said stem fitting.

This procedure is a radical departure from methods heretofore employed in the production of smokers' pipes. Prior to my invention, the metal fitting carried by the bowl and the stem was assembled in the stem, and the metal fitting carried by the bit was assembled in the bit, and in completing the pipe, the bit fitting was adjusted to the stem fitting in the same manner employed by the user when cleaning the pipe.

The invention consists primarily in a smoker's pipe embodying therein a bowl having a stem with a socket adjacent one end thereof, a metal stem fitting having an interiorly screw threaded cylindrical portion adapted to seat within said socket, means whereby said fitting may be immovably secured within said stem, and an enlarged end portion having an exterior shoulder adapted to engage and form a seal between said fitting and the end of said stem, said end portion having an interior diameter greater than that of said screw threaded portion to form a sealing surface intermediate the ends of and within said fitting, and a metal bit fitting having a tenon provided with exterior screw threads adapted to cooperate with the screw threads in said stem fitting, an enlarged cylindrical portion adjacent said tenon forming a shoulder having a sealing surface adapted to engage the sealing surface within said stem fitting, and means whereby a bit may be secured thereto, whereby when assembling a pipe said sealing shoulders may be engaged before said stem fitting is secured to the stem and said exterior shoulder may be engaged with the end of the stem when securing said stem fitting to the stem to permit accuracy in the positioning of the bit and the bowl during assembly of the pipe and avoid tilting of the bowl and bit in relation to each other, when removing and replacing the bit, after assembly of the pipe, and in such other novel features of construction and combination of parts, and in the novel procedure followed in assembling the parts of the pipe, as are hereinafter set forth and described, and more particularly pointed out in the claims hereto appended.

Referring to the drawing.

Like numerals refer to like parts throughout the several views.

Figure 1:
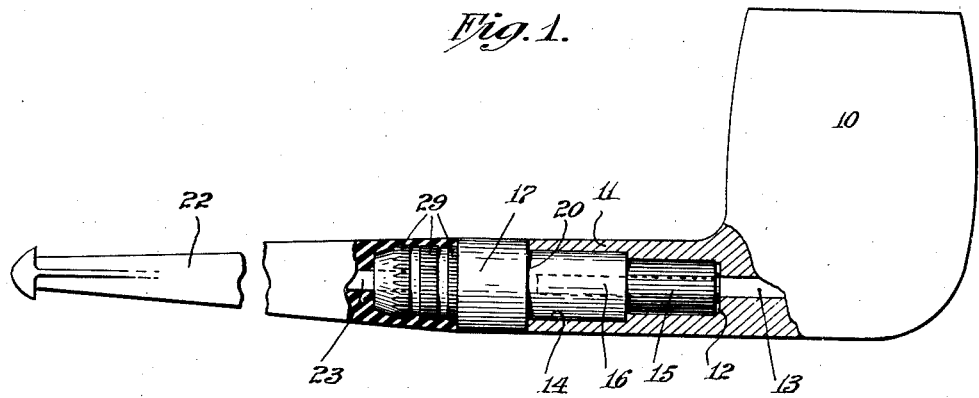
Fig. 1 is a side view, with parts thereof broken away, of a pipe embodying the invention.
Figure 2:
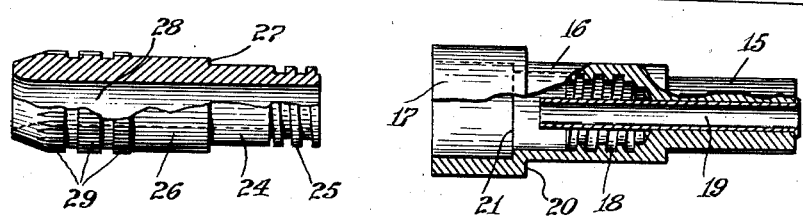
Fig. 2 is an exploded view, partly in section, of the two metal fittings.
Figure 3:
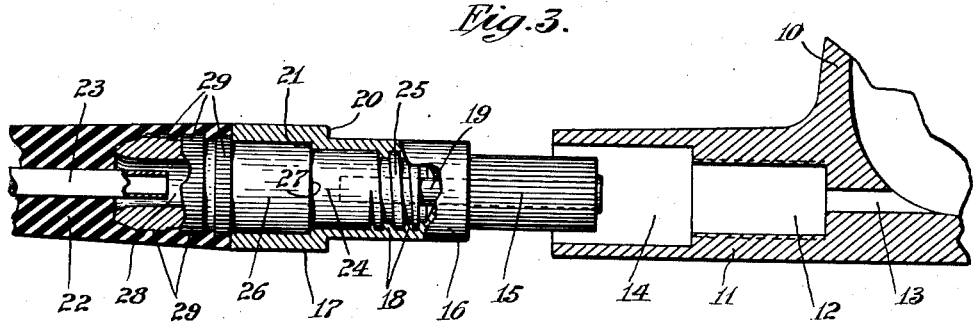
Fig. 3 is a view, partly in section, showing the relation of parts immediately prior to the assembly of the stem fitting in relation to the stem.

In the embodiment of the invention shown in the drawing, the bowl 10 of the pipe has a stem 11. This stem has therein a stepped socket, the inner portion 12 of which communicates with a smoke opening 13 leading into the bowl of the pipe, and the outer portion 14 of which is of larger diameter than the portion 12 and opens outwardly of the stem. Said bowl and said stem commonly are made of briar wood.

It is desirable in a pipe to have an air and liquid proof joint between the stem and the bit, and to secure such a joint without having a tilt in the bowl or, what is known as a "cocking" of the bit. The so-called "cocking" of the bit refers to that condition where the flattened or splayed portion of the bit extends slightly obliquely to a plane through the axis of the bowl and of the bit.

In the pipe of the invention, I employ metal fittings, one of which in the completely assembled pipe is carried by, and immovable in relation to, the stem, and the other of which is carried by and immovable in relation to the bit, the joint being formed during the manufacture of the pipe by the assembly of these fittings before the stem fitting is mounted in the stem. In this manner, the relation of the bit to the bowl may be established after the joint is formed, so that thereafter, irrespective of the number of times that the bit is removed from the stem, when it is restored to the stem it will always have the same position in relation to the bowl.

As shown in the drawing, the metal stem fitting consists of a tenon 15 having a roughened outer surface, preferably consisting of longitudinally extending parallel teeth adapted to enter the socket portion 12 and bite into the wall of this socket in a manner to firmly anchor the fitting to the stem 11, so as to prevent turning movement of the fitting in relation to the stem and the bowl.

At one end of the tenon 15 the fitting has a cylindrical portion 16 having a close sliding and turning fit within the portion 14 of the stem socket, and beyond the cylindrical portion 16, a second cylindrical portion 17 of larger diameter than the portion 16 adapted to engage and have a tight fit against the end of the stem 11.

The cylindrical portion 16 is provided with interior screw threads 18, by means of which the bit may be secured to the stem and form an air and liquid tight joint within the stem between the metal bit fitting and the metal stem fitting.

Carried by the tenon portion 15 is a tube 19, one end of which is adapted to register with the smoke opening 13 between the stem and the bowl, and the other end of which projects within the cylindrical portion 16 to an extent to enter a well in the bit formed by the bit fitting. This tube 19 is concentric with both the stem fitting and the bit fitting.

The outside diameter of the cylindrical portion 17 is larger than the outside diameter of the portion 16 to provide an exterior shoulder 20 adapted to engage the end of the stem 11, and the interior diameter of said portion 17 is greater than the inside diameter of the portion 16 so as to form an interior shoulder 21 utilized in forming an air and liquid tight joint between the stem fitting and the bit fitting.

By so locating the surface 21, a tight metal to metal joint may be secured at a point within the stem fitting so that even though a small quantity of precipitate, by reason of carelessness of a smoker, might pass the shoulder 21, the wall of the portion 17 and a co-operating cylindrical portion of the bit fitting will prevent the escape of such precipitate to the outside of the stem where its presence will be visible to the smoker.

The bit 22 of the pipe may be made of hard vulcanized rubber, Bakelite or any other desired material having in the bore thereof a tube 23 projecting into a well formed in a metal fitting, immovably secured to the bit by being molded into the material of said bit.

Carried by one end of the bit 22 and immovably secured thereto, as by having the material of the bit molded thereupon, is a metal fitting having a tenon 24 adapted to enter the portion 16 with a free fit, the end portion of this tenon being provided with screw threads 25 adapted to co-operate with the screw threads 18 within said portion 16.

At one end of the portion 24 is a cylindrical portion 26, of larger outside diameter than said portion 24, so as to form a shoulder 27, the surface of which is adapted to engage the surface of the shoulder 21 in forming an air and liquid tight joint between the two fittings in the manner above described.

The tenon 24, including its screw threaded end 25, is of a length to ensure a close abutting relation of the shoulders 21 and 27 when the tenon is screwed into the stem fitting.

The portion 26 is of a diameter to have a free fit within the opening of the cylindrical portion 17 of the stem fitting, and projects from the end of the bit a distance substantially equalling the length of the opening in the portion 17 of the stem fitting, so that substantially simultaneously with the engagement of the surface 27 with the surface 21, the end of the bit will engage the end of the portion 17.

Said bit fitting has a bore of sufficiently large diameter to form a well 28 in that end of the bit adjacent the stem 11. In the assembled pipe structure, the relation of parts is such that the tube 23 enters one end of and is concentric with this well 28, and the tube 19 enters and is concentric with the opposite end of said well. The two tubes are spaced apart sufficiently, however, to ensure the expansion of the smoke drawn into this well and the precipitation of any fluids present in the smoke. This feature, however, is old and well known in the art.

The end of the bit fitting within the bit proper is provided with roughened portions 29 serving to anchor the fitting in relation to the bit in a manner to prevent any turning of the bit in relation to the fitting, or make these parts immovable in relation to each other.

In manufacturing a pipe embodying the invention, the bit fitting is immovably secured in relation to the bit proper when making the bit, but the stem fitting is handled independently of the bowl with its stem, except in the final stage of assembly of the pipe.

As heretofore stated, the joint between the bit and the stem fitting is made prior to the mounting of said fitting in the stem. Since this avoids the necessity for any minute adjustments of the bit in relation to the stem, it is possible to use coarse, square threads and co-operating screw threads having a low pitch. With such a construction, not only is the production of the metal fittings simplified and cheapened, but the bit may be removed from the stem for cleaning purposes with a short turning movement, as compared with the use of fine threads of high pitch.

In the factory production of pipes embodying the invention, the bowl and stem are made and shaped, and the bit with the metal fitting therein is produced, in the usual manner. The metal stem fitting is then passed over the tenon of the bit fitting until the co-operating screw threads 18 and 25 are engaged, one with the other, and the stem fitting is then turned until the shoulder 25 is brought up hard against the shoulder 21 to form an air and liquid tight joint located well within the stem fitting.

The milled or grooved tenon 15 is then inserted through the portion 14 of the socket in the stem, and into the biar wood or other material of the stem about the opening 12, by means of tools and jigs which will hold the bowl in a fixed position; position the flattened or splayed end of the bit in a plane at right angles to the axis of the bowl, and force the stem fitting, with the bit still connected therewith, longitudinally of the stem until the tenon 15 completely occupies the portion 12 of the stem socket, the end of the cylindrical portion 16 of said fittings engages the material of the stem about the socket portion 12, and the end of the cylindrical portion 17 engages the end of the stem.

The cylindrical portion 17, positioned beyond the end of the stem, gives a decorative finish to the pipe, resembling the metal ferrule commonly used for preventing splitting of the stem. The engagement of the cylindrical portions 16 and 17 with any portion of the socket 12—14 is not essential to prevent seepage of precipitate through the stem, since no seepage occurs at this point. A fairly tight fit, however, is desirable in order to secure uniformity in the factory product and avoid objectionable crevices between the end of the stem and the portion 17 of the stem fitting.

It will be noted that by using a tenon 15 reduced in diameter as compared with other portions of the stem fitting, sufficient body is provided about the socket portion 12 to minimize likelihood of cracking of the stem when assembling the structure in the manner described.

Since the screw threaded tenon 24 can have no further turning movement, excepting a reversal of that in applying the bit to the stem fitting, the position of the bit in relation to the bowl is thus properly and permanently established, and when removing and replacing the bit, this relation will be restored and no "cocking" of the bit or tilting of the bowl will develop during the life of the pipe.

By immovably securing the stem fitting to the stem by means of the roughened tenon 15, there can be no turning movement of this fitting in relation to the stem, and by reason of the structure described, there can be no turning movement of the bit in relation to the bit fitting. This condition cannot be improved by the use of adhesive, since the aluminum alloy used in making the fittings does not offer an effective anchorage to an adhesive.

By using metallic fittings constructed and operating, and following the method of assembling, all as described, a smoker's pipe is produced in which the bowl is always properly positioned in relation to the flattened or splayed portion of the bit, and a tight air and liquid proof joint is formed within the metal stem fitting preventing the escape of any precipitate between the stem fitting and the end of the bit. With the use of the pipe, such precipitate will accumulate in the well formed within the bit fitting and may seep from this well through the co-operating screw threads and the outer face of the bit fitting unless such a joint is provided in the structure.

It is not my intention to limit the invention to the precise arrangement and construction of parts shown in the accompanying drawing, it being obvious that such may be varied without departing from the spirit and scope of the invention.

Having described the invention, what I claim as new and desire to have protected by Letters Patent is:

1. A smoker's pipe embodying therein a bowl having a stem with a socket adjacent one end thereof, a metal stem fitting having an interiorly screw threaded cylindrical portion adapted to seat within said socket, means whereby said fitting may be immovably secured within said stem, and an enlarged end portion having an exterior shoulder adapted to engage and form a seal between said fitting and the end of said stem, said end portion having an interior diameter greater than that of said screw threaded portion to form a sealing surface intermediate the ends of and within said fitting, and a metal bit fitting having a tenon provided with exterior screw threads adapted to co-operate with the screw threads in said stem fitting, an enlarged cylindrical portion adjacent said tenon forming a shoulder having a sealing surface adapted to engage the sealing surface within said stem fitting, and means whereby a bit may be secured thereto, whereby when assembling a pipe said sealing shoulders may be engaged before said stem fitting is secured to the stem and said exterior shoulder may be engaged with the end of the stem when securing said stem fitting to the stem to permit accuracy in the positioning of the bit and the bowl during assembly of the pipe and avoid tilting of the bowl and bit in relation to each other, when removing and replacing the bit, after assembly of the pipe.

2. A smoker's pipe embodying therein a bowl having a stem with a socket adjacent one end thereof, a metal stem fitting having an interiorly screw threaded cylindrical portion adapted to seat within said socket, a tenon having longitudinally extending teeth adapted to engage the material of said stem adjacent the bowl whereby said fitting may be immovably secured within said stem, and an enlarged end portion having an exterior shoulder adapted to engage and form a seal between said fitting and the end of said stem, said end portion having an interior diameter greater than that of said screw threaded portion to form a sealing surface intermediate the ends of and within said fitting, and a metal bit fitting having a tenon provided with exterior screw threads adapted to co-operate with the screw threads in said stem fitting, an enlarged cylindrical portion adjacent said tenon forming a shoulder having a sealing surface adapted to engage the sealing surface within said stem fitting, and means whereby a bit may be secured thereto, whereby when assembling a pipe said sealing shoulders may be engaged before said stem fitting is secured to the stem and said exterior shoulder may be engaged with the end of the stem when securing said stem fitting to the stem to permit accuracy in the positioning of the bit and the bowl during assembly of the pipe and avoid tilting of the bowl and bit in relation to each other, when removing and replacing the bit, after assembly of the pipe.

3. A smoker's pipe embodying therein a bowl having a stem with a socket adjacent one end thereof, a metal stem fitting having a cylindrical portion adapted to seat within said socket and having interior coarse square threads of low pitch, means whereby said fitting may be immovably secured within said stem, and an enlarged end portion having an exterior shoulder adapted to engage and form a seal between said fitting and the end of said stem, said end portion having an interior diameter greater than that of said screw threaded portion to form a sealing surface intermediate the ends of and within said fitting, and a metal bit fitting having a tenon provided with exterior coarse square threads of low pitch adapted to co-operate with the screw threads in said stem fitting, an enlarged cylindrical portion adjacent said tenon forming a shoulder having a sealing surface adapted to engage the sealing surface within said stem fitting, and means whereby a bit may be secured thereto, whereby when assembling a pipe said sealing shoulders may be engaged before said stem fitting is secured to the stem and said exterior shoulder may be engaged with the end of the stem when securing said stem fitting to the stem to permit accuracy in the positioning of the bit and the bowl during assembly of the pipe and avoid tilting of the bowl and bit in relation to each other, when removing and replacing the bit, after assembly of the pipe.

4. A smoker's pipe embodying therein a bowl having a stem with a socket adjacent one end thereof, a metal stem fitting having a cylindrical portion adapted to seat within said socket and having interior coarse square threads of low pitch, a tenon having longitudinally extending teeth adapted to engage the material of said stem adjacent the bowl whereby said fitting may be immovably secured within said stem, and an enlarged end portion having an exterior shoulder adapted to engage and form a seal between said fitting and the end of said stem, said end portion having an interior diameter greater than that of said screw threaded portion to form a sealing surface intermediate the ends of and within said fitting, and a metal bit fitting having a tenon provided with exterior coarse square threads of low pitch adapted to co-operate with the screw threads in said stem fitting, an enlarged cylindrical portion adjacent said tenon forming a shoulder having a sealing surface adapted to engage the sealing surface within said stem fitting, and means whereby a bit may be secured thereto, whereby when assembling a pipe said sealing shoulders may be engaged before said stem fitting is secured to the stem and said exterior shoulder may be engaged with the end of the stem when securing said stem fitting to the stem to permit accuracy in the positioning of the bit and the bowl during assembly of the pipe and avoid tilting of the bowl and bit in relation to each other, when removing and replacing the bit, after assembly of the pipe.

DAVID P. LAVIETES.